(12) United States Patent
Roschmann et al.

(10) Patent No.: US 7,858,682 B2
(45) Date of Patent: Dec. 28, 2010

(54) AQUEOUS COATING COMPOSITION WITH LOW VOC CONTENT

(75) Inventors: Konrad Roschmann, Ludwigshafen-Edigheim (DE); Joerg Leuninger, Mainz (DE); Rolf Dersch, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 12/095,039

(22) PCT Filed: Nov. 15, 2006

(86) PCT No.: PCT/EP2006/068476

§ 371 (c)(1),
(2), (4) Date: May 27, 2008

(87) PCT Pub. No.: WO2007/060118

PCT Pub. Date: May 31, 2007

(65) Prior Publication Data

US 2008/0262145 A1 Oct. 23, 2008

(30) Foreign Application Priority Data

Nov. 25, 2005 (DE) .................... 10 2005 056 591

(51) Int. Cl.
*C08K 5/05* (2006.01)
*C09D 11/00* (2006.01)
*C09D 5/02* (2006.01)
*C08L 31/00* (2006.01)
*C08L 33/00* (2006.01)

(52) U.S. Cl. .................... 524/386; 524/556

(58) Field of Classification Search ................ 524/386, 524/556
See application file for complete search history.

(56) References Cited

U.S. PATENT DOCUMENTS 3,309,331 A    3/1967   McDowell et al.
4,102,843 A    7/1978   Sperry et al.
4,137,205 A *  1/1979   Berenschot et al. ......... 524/377
4,539,363 A    9/1985   Backhouse
6,423,775 B1   7/2002   Brune et al.

FOREIGN PATENT DOCUMENTS

| DE | 23 40 975 | | 2/1975 |
|---|---|---|---|
| DE | 199 03 979 | A1 | 8/2000 |
| EP | 1 106 660 | A1 | 6/2001 |
| EP | 1 118 632 | A2 | 7/2001 |
| GB | 1 379 335 | | 1/1975 |
| JP | 11-124508 | | 5/1999 |
| JP | 2002-234904 | | 8/2002 |
| JP | 2004-59622 | | 2/2004 |
| WO | WO 97/49739 | | 12/1997 |
| WO | WO 2005/054384 | A1 | 6/2005 |

OTHER PUBLICATIONS

Wolfgan Gerhartz, et al., "Ullmann's Encyclopedia of Industrial Chemistry", Antifreezes, Fifth, Completely Revised Edition, vol. A3, Aug. 13, 2008, pp. 1-11.
U.S. Appl. No. 12/665,554, filed Dec. 18, 2009, Vandermeulen, et al.
U.S. Appl. No. 12/601,293, filed Nov. 23, 2009, Balk, et al.
U.S. Appl. No. 12/741,244, filed May 4, 2010, Roller, et al.

* cited by examiner

*Primary Examiner*—Mark Eashoo
*Assistant Examiner*—Angela C Scott
(74) *Attorney, Agent, or Firm*—Oblon, Spivak, McClelland, Maier & Neustadt, L.L.P.

(57) ABSTRACT

The present invention aqueous coating compositions comprising
(a) an acrylate-based binder comprising 1% to 10% by weight of at least one hydroxy-functional comonomer of the general formula (I)

$A\text{-}[B]_n\text{-}C$ where
A is a polymerizable group,
B is a spacer,
C is a hydroxy-functional radical, and
n is 0 or 1,
(b) at least one pigment,
(c) water,
(d) less than 3% by weight of antifrost agent, and
if appropriate, further, customary auxiliaries.

17 Claims, No Drawings

AQUEOUS COATING COMPOSITION WITH LOW VOC CONTENT

The present invention relates to the use of hydroxy-functional copolymers in aqueous coating compositions, such as color and paper coating compositions, to reduce the VOC content while maintaining the freeze/thaw stability of these compositions.

Color coating compositions such as latex paints are employed for a variety of applications, including interior and exterior applications, and flat, semigloss, and gloss applications. To provide latex paints which exhibit effective film formation it is common to add coalescents to them. Examples of coalescents are 2,2,4-trimethyl-1,3-pentanediol monoisobutyrate (i.e., TEXANOL®, available commercially from Eastman Chemical) and 2-ethylhexyl benzoate (i.e., VELATE® 378, available commercially from Vesicol Corporation).

Besides coalescents, latex paints comprise antifrost agents, so that the paint can be used even after frost exposure. The antifrost agents generally also increase the open time for latex paints. Examples of antifrost agents are ethylene glycol, diethylene glycol, and propylene glycol. A detailed discussion of these antifrost agents is found in "Antifreezes", Ullmann's Encyclopedia of Industrial Chemistry, 5th edition, volume A3, pages 23-31.

The additives used as coalescents and antifrost agents fulfill their purpose but are becoming increasingly less desirable, since they constitute volatile organic compounds (VOCs). After the latex paint has been applied to a substrate, the VOCs slowly evaporate into the environment. Given the ever further dropping allowable VOC contents in the wake of increasing environmental regulations, a need has come about in the industry to produce latex paints with lower VOC contents. In addition there is a need to pre-serve the performance capabilities of latex paints even with these lower VOC contents.

EP 1 106 660 describes a resin composition for an aqueous paint that comprises emulsion particles with a different phase structure, the emulsion particles with different phase structure having an external phase containing 1% to 20% by weight of an ethylenically unsaturated monomer having at least one polyethylene glycol chain and/or polypropylene glycol chain.

Although the use of hydroxy-functional comonomers in dispersions is not unknown, their use to raise the freeze/thaw stability has not been described to date. Hydroxyfunctional comonomers are used preferentially as dispersive or reactive polymer components.

Thus U.S. Pat. No. 4,102,843 describes the synthesis and use of dispersing resins which comprise 25-90% of hydroxy-functional monomers; hydroxyethyl, hydroxypropyl and glycerol methacrylates are mentioned by name.

JP 2002-234904 describes freeze/thaw-stable wood glues which comprise up to 10% of a hydrolyzed polyvinyl alcohol protective colloid and also hydroxyethyl (meth)acrylate and hydroxypropyl acrylate as a dispersive component.

DE 19903979 describes the functionalization of starch as a polyhydroxy compound with hydroxyethyl (meth)acrylate and the subsequent use of these macromonomers.

Examples that may be mentioned of the incorporation of hydroxy-functional comonomers as a reactive group include U.S. Pat. No. 4,539,363 (2-stage polymers with up to 30% of hydroxy monomer in the outer shell as crosslinker component) and JP 11-124508 (latex comprising vic-diol groups as room-temperature-reactive side groups). In these cases it is the reactivity of the alcohol function with respect, for instance, to epoxides, carboxylic acids or isocyanates that is exploited.

DE 2340975 describes derivatives of glycerol (meth)acrylate or glycerol allyl ether as stabilizing comonomers; their activity, however, is based on the polyethylene oxide chain contained in the side chain.

Similarly, although JP 2004-059622 does mention the use of hydroxyethyl acrylate as a normal comonomer in a core/shell polymer which is used as a low-VOC binder, the required freeze/thaw stability is provided by the incorporation of a hydrophilic monomer containing sulfonic acid groups or amide groups and/or polyethylene oxide or polypropylene oxide chains into the hard outer shell.

U.S. Pat. No. 3,309,331 describes the reaction of a carboxylate-functional latex with aziridines. This leads to the functionalization of the polymer chain with 2-aminoethyl esters or 2-hydroxyethyl amides, respectively; to implement the freeze/thaw stability property 0.3%-10% of nonionic emulsifier is used.

It was an object of the present invention to provide an aqueous coating material, particularly for latex paints, that produces coatings having a low VOC content and improved freeze/thaw stability.

In accordance with the invention the object has been achieved by means of aqueous coating materials comprising (a) acrylate-based binder comprising 1% to 10% by weight of at least one hydroxy-functional comonomer of the general formula (I)

where

A is a polymerizable group,

B is a spacer,

C is a hydroxy-functional radical, and n is 0 or 1, (b) at least one pigment, (c) water, (d) 0 to 3% by weight of antifrost agent, and (e) if appropriate, further, customary auxiliaries.

The polymerizable groups A are any of a vinyl group CH2=CH—, a (meth)allyl group CH2=CH—CH2- or CH2=CCH3-CH2-, a (meth)acryloyl group CH2=CH—C(O)— or CH2=CCH3-C(O)—, or monoesters of itaconic, maleic or fumaric acid, R—O—C(O)—CH2-C(CH2)-C(O)— or R—O—C(O)—CH=CH—C(O)—, with R=H, $C_1$-$C_{10}$ alkyl or B'-C', where B' and C' possess the same definition as B and C and may be the same as or different than B and C. Preference is given to using methacryloyl or acryloyl groups.

The functional moieties C are either open-chain or cyclic structures. Open-chain structures satisfy the general formula —(CHOH)$_n$—H; n in this case is preferably 1-5, more preferably 1-2.

The group of the spacers B for open-chain moieties C comprises —O—CH2-, —O—CHCH3-, —O—CH2-CH2-O—CH2-, O—CH2-CHCH3-O—CH2- or —O—CHCH3-CH2-O—CH2-, —X—C(O)— with X=O, NH, —O—CH2-CH2-X—C(O)—, O—CH2-CHCH3-X—C(O)— or —O—CHCH3-CH2-X—C(O)—, —O—CH2-C(CH3)(CH2OH)—, —O—CH2-C(CH2CH3)(CH2OH)—, —O—CH2-C(CH2OH)$_2$—.

Cyclic structures C derive from sugars which are in the furanose

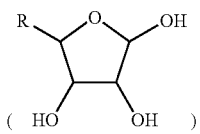

or pyranose

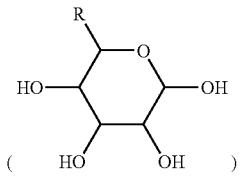

form and are linked at a hydroxyl group to the remainder, A–B, of the molecule, preference being given here to derivatives of glucose or galactose, i.e., R=(CHOH)n–H with n=2 or 1 respectively.

In the case of cyclic structures C there is no need to use the spacer B—i.e., the polymerizable moiety A is attached directly to C. The group of the spacers B for cyclic moieties C comprises —O—CH2-CH2-, O—CH2-CHCH3- or —O—CHCH3-CH2-, and —O—CH2-C(O)—.

Examples of suitable hydroxy-functional comonomers of the formula (I) are hydroxyethyl (meth)acrylate, glycerol (meth)allyl ether, glycerol mono(meth)acrylate, sorbitol mono(meth)acrylate, trimethylolpropane monoallyl ether, trimethylolpropane mono(meth)acrylate, pentaerythritol mono(meth)acrylate, 2-methacryloyloxyethylglucopyranoside, allyl-glucopyranoside, and acyloylgalactopyranoside. Particular preference among these is given to glycerol monomethacrylate (Blemmer® GLM) and glycerol monoacrylate. The normally employed, inventive amount of hydroxy-functional comonomer is between 1% and 10% (based on the total weight of the polymer), preferably 2-5%.

It has been found that through the use of hydroxy-functional comonomers for aqueous coating compositions it is possible to reduce significantly the amount of antifrost agents required. Thus freeze/thaw-stable coating compositions (emulsion paints, for example) which in accordance with this invention include hydroxy-functional comonomers can be produced using a small amount of antifrost additives or even none at all. Aqueous coating compositions of the invention include less than 3% (based on the total weight of the aqueous composition), preferably less than 1% by weight, of antifrost agents. Particular preference is of course given to that case in which the coating composition is virtually free from antifrost agents. Hence coating compositions produced in accordance with this invention comprise relatively low amounts of volatile organic compounds (VOCs) and are therefore more environmentally friendly.

The invention further provides accordingly for the use of the comonomers of the general formula (I) for improved freeze/thaw stability of aqueous coating materials, particularly latex paints.

The inventive hydroxy-functionalization of the polymer dispersion can be brought about by a variety of methods. Thus it is possible either to copolymerize hydroxy-functional comonomers directly or else only subsequently to convert appropriate precursors into hydroxy-functional comonomers. For example, consideration may be given to opening the epoxide ring of glycidyl methacrylate (GMA) with water either before (in situ derivatization) or after (polymer-analogous reaction) incorporating the monomer into the polymer, and this is equivalent to the use of glycerol monomethacrylate.

The latex polymer (a) used in the aqueous coating composition derives preferably from monomers which comprise at least one acrylic monomer from the group consisting of acrylic acid, acrylic esters, methacrylic acid, and methacrylic esters. Additionally the latex polymer may, if appropriate, one or more monomers from the group consisting of styrene, α-methylstyrene, vinyl chloride, acrylonitrile, methacrylonitrile, acrylamide, methacrylamide, vinyl acetate, vinyl esters of branched tertiary monocarboxylic acids (e.g., vinyl esters available commercially under the trade name VEOVA® from Shell Chemical Company or sold under the designation EXXAR® Neo Vinyl Esters by ExxonMobil Chemical Company), dicarboxylic acids such as itaconic acid, crotonic acid, maleic acid, fumaric acid, and also their monoesters, and ethylene. Also possible is the accompanying use of conjugated $C_4$-$C_8$ dienes, such as 1,3-butadiene, isoprene, and chloroprene. The monomers preferably comprise one or more monomers from the group consisting of n-butyl acrylate, methyl methacrylate, styrene, and 2-ethylhexyl acrylate. The latex polymer is generally selected from the group consisting of straight acrylic resins (comprising as principal monomers acrylic acid, methacrylic acid, an acrylic ester and/or a methacrylic ester); styrene-acrylic resins (comprising as principal monomers styrene and acrylic acid, methacrylic acid, an acrylic ester and/or a methacrylic ester); vinyl-acrylic resins (comprising as principal monomers vinyl acetate and acrylic acid, methacrylic acid, an acrylic ester and/or a methacrylic ester); and acrylated ethylene-vinyl acetate copolymers (comprising as principal monomers ethylene, vinyl acetate, and acrylic acid, methacrylic acid, an acrylic ester and/or a methacrylic ester). The monomers may also comprise other principal monomers, such as acrylamide and acrylonitrile, and one or more functional monomers, such as acrylic acid, methacrylic acid, itaconic acid, acetylacetoxy ethyl methacrylate, and ureidomethacrylate, as will be readily apparent to the skilled worker. In one particularly preferred embodiment the latex polymer is a straight acrylic resin, such as a butyl acrylate/methyl methacrylate copolymer or an ethylhexyl acrylate/methyl methacrylate copolymer deriving from principal monomers comprising butyl acrylate, ethylhexyl acrylate, and methyl methacrylate.

The latex polymer (a) of the invention, comprising hydroxy-functional comonomer, can be used in the aqueous coating composition in combination with surfactants of the anionic, nonionic, cationic or amphoteric type, which are either polymerizable or nonpolymerizable. Examples of anionic surfactants include alkylbenzenesulfonic acids, sulfonated fatty acids, sulfosuccinates, fatty alcohol sulfates, alkylphenol sulfates, and fatty alcohol ether sulfates. Examples of nonionic surfactants which can be used include alkylphenol ethoxylates, primary alcohol ethoxylates, fatty acid ethoxylates, alkanolamide ethoxylates, fatty amine ethoxylates, EO/PO block copolymers, and alkylpolyglucosides. As cationic and amphoteric surfactants use is made, for example, of the following: quaternized amine alkoxylates, alkylbetaines, alkylamidobetaines, and sulfobetaines. In particular the polymer latex binder can be prepared by means of emulsion polymerization, by supplying monomers including at least one hydroxy-functional comonomer of the invention to a reactor in the presence of at least one initiator and at least one emulsifier as described below, and polymerizing the monomers to form the latex binder.

The initiator may be any desired initiator known per se for use in emulsion polymerization, such as ammonium, sodium or potassium persulfate, or a redox system, which generally comprises an oxidant and a reductant. Customary redox initiator systems are described for example by A.S. Sarac in Progress in Polymer Science 24 (1999), 1149-1204.

Suitable emulsifiers are found for example in Houben-Weyl, Methoden der organischen Chemie, volume XIV/1, Makromolekulare Stoffe [Macromolecular compounds], Georg Thieme Verlag, Stuttgart, 1961, pages 192 to 208.

To prepare the polymer latex binder first of all an initiator solution is prepared which comprises the initiator and water. Additionally at least one preliminary monomer emulsion is prepared which comprises at least a fraction of the monomers used to form the latex polymer, including the hydroxy-functional comonomer of the invention, one or more surfactants, water, and additional additives, such as NaOH. The initiator solution and the preliminary monomer emulsion are then fed continuously over a defined time period (1.5 to 5 hours, for example) into the reactor in order to bring the monomers to polymerization and so to prepare the latex polymer. It is preferred to add at least a fraction of the initiator solution to the reactor before the preliminary monomer emulsion is added. Prior to the addition of the initiator solution and of the preliminary monomer emulsion it is possible to place a seed latex in the reactor, such as a polystyrene seed latex. The purpose of using the seed latex is to give a uniform particle size distribution, and its use does not affect the freeze/thaw stability of the paint. Moreover, prior to the addition of the initiator and the addition of the preliminary monomer emulsion, water, one or more surfactants, and monomers not provided in the preliminary monomer emulsion can be placed in the reactor. For preparing the polymer latex binder the reactor is operated at an elevated temperature at least until all of the monomers have been added.

In order to be able to fulfill the requirement for effective filming of the coating composition without addition of film-forming assistants, in combination with good blocking resistance, in one preferred embodiment the hydroxy-functionalized latex polymer of the invention is prepared in a two-stage process, as described in EP 710680, by using two different preliminary monomer emulsions, resulting in the formation of two polymer phases, a soft phase and a hard phase. The hydroxy-functional comonomer of the invention may be comprised in one or in both preliminary emulsions/phases; for maximum effect in relation to the freeze/thaw stability of the latex polymer, however, it should be copolymerized preferably in the soft phase.

Following its preparation, the polymer latex binder is preferably stripped chemically in order to reduce the residual monomer content. Chemical stripping takes place preferably by continuous addition of an oxidant, such as a peroxide (tert-butyl hydroperoxide, for example) and a reductant (sodium acetone bisulfite, for example), or of another redox duo, such as that of A.S. Sarac in Progress in Polymer Science 24 (1999), 1149-1204, for example, to the latex binder at an elevated temperature over a defined time period (0.5 hour, for example). The pH of the latex can then be adjusted and, following chemical stripping, a biocide or other additives can be added. If appropriate, for further reduction of volatile organic compounds (VOCs), the latex may be subjected as well to additional, physical stripping, as described for example in DE 19745580 or in EP 897931.

The polymer dispersion comprising the above-described latex polymer (a) preferably has a solids content of about 30% to about 75% and an average latex particle size of about 50 to about 650 nm. The amount of the latex polymer in the aqueous coating composition is preferably about 5 to about 60 percent by weight and more preferably about 8 to about 40 percent by weight (i.e., the weight percentage fraction of the dry latex polymer, based on the total weight of the coating composition).

As mentioned above, the aqueous coating composition comprises at least one pigment. For the purposes of the present invention the term "pigment" comprises nonfilm-forming solids such as pigments, extenders, and fillers. Said at least one pigment is selected preferably from the group consisting of $TiO_2$ (both in anatase form and in rutile form), clay (aluminum silicate), $CaCO_3$ (both in comminuted form and in precipitated form), alumina, silica, magnesium oxide, talc (magnesium silicate), barites (barium sulfate), zinc oxide, zinc sulfite, sodium oxide, potassium oxide, and mixtures thereof. Suitable mixtures include mixtures of metal oxides, such as those sold under the trade names MINEX® (oxides of silicon, aluminum, sodium, and potassium, available commercially from Unimin Specialty Minerals), CELITES® (alumina and silica, available commercially from Celite Company), ATOMITES® (available commercially from English China Clay International), and ATTA-GELS® (available commercially from Engelhard). With particular preference said at least one pigment comprises $TiO_2$, $CaCO_3$ or clay. The average particle size of the pigments is generally in the range from about 0.01 to about 50 microns. Thus, for example, the $TiO_2$ particles used in the aqueous coating composition generally have an average particle size of about 0.15 to about 0.40 micron. The pigment may be added to the aqueous coating composition in the form of a powder or a slurry. Within the aqueous coating composition the pigment is present preferably in an amount of about 5 to about 50 percent by weight, more preferably about 10 to about 40 percent by weight.

The coating composition may if appropriate comprise additives, such as one or more film-forming assistants or coalescents. Suitable film-forming assistants or coalescents include plasticizers and drying retardants, such as high-boiling polar solvents. In accordance with the invention it is also possible to use other conventional additives, such as dispersants, additional surfactants (i.e., wetting agents), rheology modifiers, defoamers, thickeners, biocides, mildewcides, colorants such as color pigments and dyes, waxes, fragrances, cosolvents, and the like. For preparing the polymer latex it is possible for example to use nonionic and/or ionic (e.g., anionic or cationic) surfactants. Within the aqueous coating composition these additives are present generally in an amount of 0 to about 15% by weight, more preferably of about 1% to about 10% by weight, based on the total weight of the coating composition.

As mentioned above, the aqueous coating composition comprises less than 3.0% by weight of antifrost agent, based on the total weight of the aqueous coating composition. Examples of antifrost agents are ethylene glycol, diethylene glycol, propylene glycol, glycerol (1,2,3-trihydroxypropane), ethanol, methanol, 1-methoxy-2-propanol, 2-amino-2-methyl-1-propanol, and FTS-365 (a freeze/thaw stabilizer from Inovachem Specialty Chemicals). With particular preference the aqueous coating composition comprises less than 1.0% by weight of antifrost agent or is largely free (i.e., comprises less than 0.1% by weight) of antifrost agent. Accordingly the aqueous coating composition of the invention has a VOC content of preferably less than about 100 g/l and more preferably less than or equal to about 50 g/l. Although the aqueous coating compositions of the invention comprise little antifrost agent or none at all, the compositions possess freeze/thaw stabilities to levels which are desirable in the art. By way of example the aqueous coating compositions of the invention may be subjected to freeze/thaw cycles in accordance with ASTM Method D2243-82 without undergoing coagulation. The aqueous coating compositions can also pass a drawdown test carried out in accordance with the method discussed below. Furthermore, the aqueous coating compositions of the invention have good heat storage stability and, after 14 days' storage at 50° C. in accordance with the method discussed below, exhibit increases in Stormer viscosity of less than 15 KU, more preferably 10 KU or less.

The remainder of the aqueous coating composition of the invention is made up of water. Although a large part of the water is present in the polymer latex dispersion and in other components of the aqueous coating composition, water is generally added separately as well to the aqueous coating composition. The aqueous coating composition comprises generally about 10% to about 85% by weight and more preferably about 35% to about 80% by weight of water. Expressed alternatively, the total solids content of the aqueous coating composition is generally about 15% to about 90% by weight, more preferably about 20% to about 65% by weight.

The coating compositions are generally formulated in such a way that the dried coatings comprise at least 10% by volume of dry polymer solids and additionally 5% to 90% by volume of nonpolymeric solids in the form of pigments. The dried coatings may also comprise additives, such as plasticizers, dispersants, surfactants, rheology modifiers, defoamers, thickeners, biocides, mildewcides, colorants, waxes, and the like which do not evaporate when the coating composition dries.

In one preferred embodiment of the invention the aqueous coating composition is a latex paint composition which comprises a latex polymer (a) derived from at least one acrylic monomer selected from the group consisting of acrylic acid, arylic esters, methacrylic acid, and methacrylic esters and from at least one polymerizable hydroxy-functional comonomer C, at least one pigment, and water.

The present invention further comprises a process for preparing an aqueous coating composition by mixing a latex polymer (a) which derives from at least one monomer and at least one polymerizable, hydroxy-functional monomer, as described above, with at least one pigment. The latex polymer (a) is preferably in the form of a latex polymer dispersion. To provide the above-discussed additives in the aqueous coating composition the additives can be added in any desired, appropriate order to the latex polymer, to the pigment or to combinations thereof. In the case of paint formulations the aqueous coating composition has a pH of preferably 7 to 10.

The aqueous coating composition is a stable fluid which can be applied to any of a wide variety of materials, such as, for example, paper, wood, concrete, metal, glass, ceramic, plastics, plaster, and roofing substrates such as asphalt coatings, roofing felts or polyurethane foam insulation; or to preliminarily coated, primed, undercoated, worn or weathered substrates. The aqueous coating composition of the invention can be applied to the materials by a variety of techniques which are well known per se, such as spreading, brushing, rolling, air-assisted spraying or airless spraying, electrostatic spraying and the like, for example.

The present invention is now elucidated further with reference to the following, nonlimiting examples.

EXAMPLE 1a

Example 1a describes the synthesis of a one-stage, nBA-based polymer dispersion containing 3% (weight percent based on dry polymer mass) of BLEMMER® GLM (glycerol monomethacrylate from Marubeni Speciality Chemicals, Düsseldorf, Germany). BLEMMER® GLM possesses the following structure:

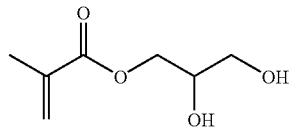

A monomer emulsion is prepared which is composed of 248 parts of water, 42.9 parts of arylsulfonate (15% strength aqueous solution), 22.3 parts of BLEMMER® GLM (92% strength aqueous solution), 5.2 parts of methacrylic acid, 276 parts of methyl methacrylate, and 349 parts of n-butyl acrylate. To prepare the initiator solution, 2.6 parts of ammonium persulfate were dissolved in 117 parts of water. A 1.5-liter glass reactor was charged with 236 parts of water, flooded with nitrogen, and heated to 78° C. When the polymerization temperature had been reached, 10% of the initiator solution and 1% of the monomer emulsion were added and initial polymerization was carried out for 20 minutes. Thereafter the remainder of the monomer emulsion and the remainder of the initiator solution were each metered in at a uniform rate, the monomer emulsion over 4 hours and the initiator solution over 4.5 hours, followed by polymerization at 78° C. for 10 minutes, after which the reaction mixture was left to cool to 65° C.

For further depletion of residual monomers a chemical deodorization was carried out by supplying the reaction mixture with 2.6 parts of a 10% strength tert-butyl hydroperoxide solution and 4.6 parts of a 5.7% strength Rongalit® C solution (BASF) simultaneously over a period of 40 minutes. After the reaction mixture had cooled to room temperature, a pH of approximately 8 was set using concentrated ammonia. The resultant polymer dispersion had a solids content of 50.9% and a particle size of 238 nm.

EXAMPLE 1b

Example 1b describes the synthesis of a one-stage, nBA-based polymer dispersion containing 5% (weight percent based on dry polymer mass) of BLEMMER® GLM.

A monomer emulsion is prepared which is composed of 248 parts of water, 42.9 parts of arylsulfonate (15% strength aqueous solution), 35.5 parts of BLEMMER® GLM (92% strength aqueous solution), 5.2 parts of methacrylic acid, 276 parts of methyl methacrylate, and 336 parts of n-butyl acrylate. To prepare the initiator solution, 2.6 parts of ammonium persulfate were dissolved in 117 parts of water. A 1.5-liter glass reactor was charged with 236 parts of water, flooded with nitrogen, and heated to 78° C. When the polymerization temperature had been reached, 10% of the initiator solution and 1% of the monomer emulsion were added and initial polymerization was carried out for 20 minutes. Thereafter the remainder of the monomer emulsion and the remainder of the initiator solution were each metered in at a uniform rate, the monomer emulsion over 4 hours and the initiator solution over 4.5 hours, followed by polymerization at 78° C. for 10 minutes, after which the reaction mixture was left to cool to 65° C.

For further depletion of residual monomers a chemical deodorization was carried out by supplying the reaction mixture with 2.6 parts of a 10% strength tert-butyl hydroperoxide solution and 4.6 parts of a 5.7% strength Rongalit® C solution (BASF) simultaneously over a period of 40 minutes. After the reaction mixture had cooled to room temperature, a pH of approximately 8 was set using concentrated ammonia. The resultant polymer dispersion had a solids content of 51% and a particle size of 279 nm.

EXAMPLE 1c

Example 1c describes the synthesis of a one-stage, nBA-based polymer dispersion containing 3% (weight percent based on dry polymer mass) of glycerol monoacrylate (laboratory product from BASF AG). Glycerol monoacrylate possesses the following structure:

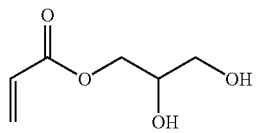

A monomer emulsion is prepared which is composed of 231 parts of water, 42.9 parts of arylsulfonate (15% strength aqueous solution), 39.0 parts of glycerol monoacrylate (50% strength aqueous solution), 5.2 parts of methacrylic acid, 276 parts of methyl methacrylate, and 349 parts of n-butyl acrylate. To prepare the initiator solution, 2.6 parts of ammonium persulfate were dissolved in 117 parts of water. A 1.5-liter glass reactor was charged with 236 parts of water, flooded with nitrogen, and heated to 78° C. When the polymerization temperature had been reached, 10% of the initiator solution and 1% of the monomer emulsion were added and initial polymerization was carried out for 20 minutes. Thereafter the remainder of the monomer emulsion and the remainder of the initiator solution were each metered in at a uniform rate, the monomer emulsion over 4 hours and the initiator solution over 4.5 hours, followed by polymerization at 78° C. for 10 minutes, after which the reaction mixture was left to cool to 65° C.

For further depletion of residual monomers a chemical deodorization was carried out by supplying the reaction mixture with 2.6 parts of a 10% strength tert-butyl hydroperoxide solution and 4.6 parts of a 5.7% strength Rongalit® C solution (BASF) simultaneously over a period of 40 minutes. After the reaction mixture had cooled to room temperature, a pH of approximately 8 was set using concentrated ammonia. The resultant polymer dispersion had a solids content of 51% and a particle size of 240 nm.

EXAMPLE 1d

Example 1d describes the synthesis of a one-stage, nBA-based polymer dispersion containing 3% (weight percent based on dry polymer mass) of HEMA (hydroxyethyl methacrylate from Lonza AG). HEMA possesses the following structure:

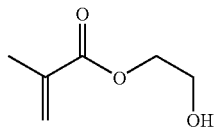

A monomer emulsion is prepared which is composed of 250 parts of water, 42.9 parts of arylsulfonate (15% strength aqueous solution), 32.5 parts of HEMA, 5.2 parts of methacrylic acid, 276 parts of methyl methacrylate, and 336 parts of n-butyl acrylate. To prepare the initiator solution, 2.6 parts of ammonium persulfate were dissolved in 117 parts of water. A 1.5-liter glass reactor was charged with 236 parts of water, flooded with nitrogen, and heated to 78° C. When the polymerization temperature had been reached, 10% of the initiator solution and 1% of the monomer emulsion were added and initial polymerization was carried out for 20 minutes. Thereafter the remainder of the monomer emulsion and the remainder of the initiator solution were each metered in at a uniform rate, the monomer emulsion over 4 hours and the initiator solution over 4.5 hours, followed by polymerization at 78° C. for 10 minutes, after which the reaction mixture was left to cool to 65° C.

For further depletion of residual monomers a chemical deodorization was carried out by supplying the reaction mixture with 2.6 parts of a 10% strength tert-butyl hydroperoxide solution and 4.6 parts of a 5.7% strength Rongalit® C solution (BASF) simultaneously over a period of 40 minutes. After the reaction mixture had cooled to room temperature, a pH of approximately 8 was set using concentrated ammonia. The resultant polymer dispersion had a solids content of 50.5% and a particle size of 314 nm.

EXAMPLE 2a

Example 2a describes the synthesis of a one-stage, EHA-based polymer dispersion containing 3% (weight percent based on dry polymer mass) of BLEMMER® GLM.

A monomer emulsion is prepared which is composed of 229 parts of water, 39.6 parts of arylsulfonate (15% strength aqueous solution), 19.7 parts of BLEMMER® GLM (92% strength aqueous solution), 4.8 parts of methacrylic acid, 282 parts of methyl methacrylate, and 295 parts of 2-ethylhexyl acrylate. To prepare the initiator solution, 2.4 parts of ammonium persulfate were dissolved in 108 parts of water. A 1.5-liter glass reactor was charged with 217 parts of water, flooded with nitrogen, and heated to 78° C. When the polymerization temperature had been reached, 10% of the initiator solution and 1% of the monomer emulsion were added and initial polymerization was carried out for 20 minutes. Thereafter the remainder of the monomer emulsion and the remainder of the initiator solution were each metered in at a uniform rate, the monomer emulsion over 4 hours and the initiator solution over 4.5 hours, followed by polymerization at 78° C. for 10 minutes, after which the reaction mixture was left to cool to 65° C.

For further depletion of residual monomers a chemical deodorization was carried out by supplying the reaction mixture with 2.4 parts of a 10% strength tert-butyl hydroperoxide solution and 4.2 parts of a 5.7% strength Rongalit® C solution (BASF) simultaneously over a period of 40 minutes. After the reaction mixture had cooled to room temperature, a pH of approximately 8 was set using concentrated ammonia. The resultant polymer dispersion had a solids content of 50.7% and a particle size of 294 nm.

EXAMPLE 2b

Example 2b describes the synthesis of a one-stage, EHA-based polymer dispersion containing 5% (weight percent based on dry polymer mass) of BLEMMER® GLM.

A monomer emulsion is prepared which is composed of 229 parts of water, 39.6 parts of arylsulfonate (15% strength aqueous solution), 32.8 parts of BLEMMER® GLM (92% strength aqueous solution), 4.8 parts of methacrylic acid, 282 parts of methyl methacrylate, and 283 parts of 2-ethylhexyl acrylate. To prepare the initiator solution, 2.4 parts of ammonium persulfate were dissolved in 108 parts of water. A 1.5-liter glass reactor was charged with 217 parts of water, flooded with nitrogen, and heated to 78° C. When the polymerization temperature had been reached, 10% of the initiator solution and 1% of the monomer emulsion were added and initial polymerization was carried out for 20 minutes. Thereafter the remainder of the monomer emulsion and the remainder of the initiator solution were each metered in at a uniform rate, the monomer emulsion over 4 hours and the initiator solution over 4.5 hours, followed by polymerization at 78° C. for 10 minutes, after which the reaction mixture was left to cool to 65° C.

For further depletion of residual monomers a chemical deodorization was carried out by supplying the reaction mixture with 2.4 parts of a 10% strength tert-butyl hydroperoxide solution and 4.2 parts of a 5.7% strength Rongalit® C solution (BASF) simultaneously over a period of 40 minutes. After the reaction mixture had cooled to room temperature, a pH of approximately 8 was set using concentrated ammonia. The resultant polymer dispersion had a solids content of 51% and a particle size of 229 nm.

EXAMPLE 2c

Example 2c describes the synthesis of a one-stage, EHA-based polymer dispersion containing 3% (weight percent based on dry polymer mass) of glycerol monoacrylate BLEMMER® GLM.

A monomer emulsion is prepared which is composed of 213 parts of water, 39.6 parts of arylsulfonate (15% strength aqueous solution), 36.0 parts of glycerol monoacrylate (50% strength aqueous solution), 4.8 parts of methacrylic acid, 282 parts of methyl methacrylate, and 295 parts of 2-ethylhexyl acrylate. To prepare the initiator solution, 2.4 parts of ammonium persulfate were dissolved in 108 parts of water. A 1.5-liter glass reactor was charged with 217 parts of water, flooded with nitrogen, and heated to 78° C. When the polymerization temperature had been reached, 10% of the initiator solution and 1% of the monomer emulsion were added and initial polymerization was carried out for 20 minutes. Thereafter the remainder of the monomer emulsion and the remainder of the initiator solution were each metered in at a uniform rate, the monomer emulsion over 4 hours and the initiator solution over 4.5 hours, followed by polymerization at 78° C. for 10 minutes, after which the reaction mixture was left to cool to 65° C.

For further depletion of residual monomers a chemical deodorization was carried out by supplying the reaction mixture with 2.4 parts of a 10% strength tert-butyl hydroperoxide solution and 4.2 parts of a 5.7% strength Rongalit® C solution (BASF) simultaneously over a period of 40 minutes. After the reaction mixture had cooled to room temperature, a pH of approximately 8 was set using concentrated ammonia. The resultant polymer dispersion had a solids content of 50.7% and a particle size of 275 nm.

EXAMPLE 3

Example 3 describes the synthesis of a two-stage polymer dispersion comprising 3% (weight percent based on dry polymer mass) of BLEMMER® GLM.

A first monomer emulsion is prepared which is composed of 187 parts of water, 24.0 parts of Disponil FES 77 (30% strength aqueous solution of a sulfated fatty acid ethoxylate, from Cognis Deutschland), 32.0 parts of Steinapol NLS (15% strength aqueous solution of sodium lauryl sulfate), 19.7 parts of BLEMMER® GLM (92% strength aqueous solution), 6.0 parts of acrylic acid, 3.0 parts of itaconic acid, 45 parts of Mhoromer 6844-0 [N-(2-methacryloyloxyethyl)ethyleneurea, 25% in MMA, from Röhm, Darmstadt, Germany], 141 parts of methyl methacrylate, and 315 parts of n-butyl acrylate. Additionally a second monomer emulsion is prepared which is composed of 43 parts of water, 6.0 parts of Disponil FES 77 (30% strength aqueous solution of a sulfated fatty acid ethoxylate, from Cognis Deutschland), 8.0 parts of Steinapol NLS (15% strength aqueous solution of sodium lauryl sulfate), and 72 parts of methyl methacrylate. The initial solution was prepared by dissolving 1.2 parts of ammonium persulfate in 23 parts of water. A 1.5-liter glass reactor was charged with 240 parts of water and 29.1 g of a polystyrene seed latex (33% form, approximately 25 nm), flooded with nitrogen, and heated to 85° C. After the polymerization temperature had been reached, 5% of the initiator solution were added and initial polymerization was carried out for 5 minutes. Thereafter the first monomer emulsion was metered in at a uniform rate over the course of 150 minutes and the remainder of the initiator solution over the course of 180 minutes; immediately after the end of addition of the first monomer emulsion, the second is metered in over a period of 30 minutes, followed by polymerization at 85° C. for 30 minutes.

For further depletion of residual monomers a chemical deodorization was carried out by supplying the reaction mixture with 6.0 parts of a 10% strength tert-butyl hydroperoxide solution and 6.4 parts of a 16.5% strength acetone bisulfite solution simultaneously over a period of 60 minutes. After the reaction mixture had cooled to room temperature, a pH of approximately 8 was set using concentrated ammonia. The resultant polymer dispersion had a solids content of 50.5% and a particle size of 132 nm.

COMPARATIVE EXAMPLE 1

Comparative Example 1 describes the synthesis of a one-stage, nBA-based polymer dispersion without hydroxy-functional comonomers.

A monomer emulsion is prepared which is composed of 248 parts of water, 42.9 parts of arylsulfonate (15% strength aqueous solution), 5.2 parts of methacrylic acid, 276 parts of methyl methacrylate, and 369 parts of n-butyl acrylate. To prepare the initiator solution, 2.6 parts of ammonium persulfate were dissolved in 117 parts of water. A 1.5-liter glass reactor was charged with 236 parts of water, flooded with nitrogen, and heated to 78° C. When the polymerization temperature had been reached, 10% of the initiator solution and 1% of the monomer emulsion were added and initial polymerization was carried out for 20 minutes. Thereafter the remainder of the monomer emulsion and the remainder of the initiator solution were each metered in at a uniform rate, the monomer emulsion over 4 hours and the initiator solution over 4.5 hours, followed by polymerization at 78° C. for 10 minutes, after which the reaction mixture was left to cool to 65° C.

For further depletion of residual monomers a chemical deodorization was carried out by supplying the reaction mixture with 2.6 parts of a 10% strength tert-butyl hydroperoxide solution and 4.6 parts of a 5.7% strength Rongalit® C solution (BASF) simultaneously over a period of 40 minutes. After the reaction mixture had cooled to room temperature, a pH of approximately 8 was set using concentrated ammonia. The resultant polymer dispersion had a solids content of 50.8% and a particle size of 251 nm.

COMPARATIVE EXAMPLE 2

Comparative Example 2 describes the synthesis of a one-stage, EHA-based polymer dispersion without hydroxy-functional comonomers.

A monomer emulsion is prepared which is composed of 229 parts of water, 39.6 parts of arylsulfonate (15% strength aqueous solution), 4.8 parts of methacrylic acid, 282 parts of methyl methacrylate, and 315 parts of 2-ethylhexyl acrylate. To prepare the initiator solution, 2.4 parts of ammonium persulfate were dissolved in 108 parts of water. A 1.5-liter glass reactor was charged with 217 parts of water, flooded with nitrogen, and heated to 78° C. When the polymerization temperature had been reached, 10% of the initiator solution and 1% of the monomer emulsion were added and initial polymerization was carried out for 20 minutes. Thereafter the remainder of the monomer emulsion and the remainder of the initiator solution were each metered in at a uniform rate, the monomer emulsion over 4 hours and the initiator solution over 4.5 hours, followed by polymerization at 78° C. for 10 minutes, after which the reaction mixture was left to cool to 65° C.

For further depletion of residual monomers a chemical deodorization was carried out by supplying the reaction mixture with 2.4 parts of a 10% strength tert-butyl hydroperoxide solution and 4.2 parts of a 5.7% strength Rongalit® C solution (BASF) simultaneously over a period of 40 minutes. After the reaction mixture had cooled to room temperature, a pH of approximately 8 was set using concentrated ammonia. The resultant polymer dispersion had a solids content of 50.8% and a particle size of 300 nm.

COMPARATIVE EXAMPLE 3

Comparative Example 3 describes the synthesis of a two-stage polymer dispersion without hydroxy-functional comonomers.

A first monomer emulsion is prepared which is composed of 189 parts of water, 24.0 parts of Disponil FES 77 (30% strength aqueous solution of a sulfated fatty acid ethoxylate, from Cognis Deutschland), 32.0 parts of Steinapol NLS (15% strength aqueous solution of sodium lauryl sulfate), 6.0 parts of acrylic acid, 3.0 parts of itaconic acid, 45 parts of Mhoromer 6844-0 [N-(2-methacryloyloxyethyl)ethyleneurea, 25% in MMA, from Röhm, Darmstadt, Germany], 141 parts of methyl methacrylate, and 333 parts of n-butyl acrylate. Additionally a second monomer emulsion is prepared which is composed of 43 parts of water, 6.0 parts of Disponil FES 77 (30% strength aqueous solution of a sulfated fatty acid ethoxylate, from Cognis Deutschland), 8.0 parts of Steinapol NLS (15% strength aqueous solution of sodium lauryl sulfate), and 72 parts of methyl methacrylate. The initial solution was prepared by dissolving 1.2 parts of ammonium persulfate in 23 parts of water. A 1.5-liter glass reactor was charged with 240 parts of water and 29.1 g of a polystyrene seed latex (33% form, approximately 25 nm), flooded with nitrogen, and heated to 85° C. After the polymerization temperature had been reached, 5% of the initiator solution were added and initial polymerization was carried out for 5 minutes. Thereafter the first monomer emulsion was metered in at a uniform rate over the course of 150 minutes and the remainder of the initiator solution over the course of 180 minutes; immediately after the end of addition of the first monomer emulsion, the second is metered in over a period of 30 minutes, followed by polymerization at 85° C. for 30 minutes.

For further depletion of residual monomers a chemical deodorization was carried out by supplying the reaction mixture with 6.0 parts of a 10% strength tert-butyl hydroperoxide solution and 6.4 parts of a 16.5% strength acetone bisulfite solution simultaneously over a period of 60 minutes. After the reaction mixture had cooled to room temperature, a pH of approximately 8 was set using concentrated ammonia. The resultant polymer dispersion had a solids content of 50.6% and a particle size of 135 nm.

Paint Formulation

The following paint formulation, with a VOC content of 0 g/l, was utilized in order to evaluate the properties of Inventive Examples 1-3 and of Comparative Examples 1-3:

| Ingredient | Parts by weight |
|---|---|
| Water | 66.5 |
| Natrosol ® 250 HR[1] | 1.1 |
| Potassium pyrophosphate TKPP[2] | 1.0 |
| Proxel ® BD 20 | 1.6 |
| Tamol ® 731[3] | 3.8 |
| Drewplus ® L 475[4] | 2.2 |
| Minex ® 4 | 86.7 |
| Omyacarb ® 10[5] | 30.7 |
| Ti-Pure ® R 941[6] | 206.7 |
| Diafil ® 525[7] | 8.7 |
| Dispersion (49.9%-51.2%) | 246.6-240.3 |
| Acrysol ® RM 2020[8] | 11.0 |
| Drewplus ® L 475 | 1.1 |
| Nuocide ® N 40-D [404-D][9] | 3.8 |
| Nopco ® DSX 1550[10] | 1.1 |
| Water | 27.6-33.8 |

The ingredients were added with stirring in the order indicated above.
[1]Hydroxyethylcellulose thickener from Hercules Inc.
[2]BK Ladenburg, Ladenburg, Germany
[3]Sodium salt of a carboxylated polyelectrolyte, 25% strength aqueous solution, pigment dispersant from Rohm & Haas Co. Philadelphia, PA, USA
[4]Defoamer from Ashland Chemical Co., Drew Industrial Division, Boonton, NJ, USA
[5]Calcium carbonate filler, particle size approximately 12 μm, Omya AG, Oftringen, Switzerland
[6]Titanium dioxide paste, 64.5% solids content, DuPont, Wilmington, De, USA
[7]Mineral filler from CR Minerals Co., Golden, CO, USA
[8]Polyurethane thickener, 20% solids content, Rohm & Haas Co. Philadelphia, PA, USA
[9]Biocide from Creanova, Piscataway, NJ, USA
[10]Nonionic rheology modifier from Cognis GmbH, Düsseldorf, Germany Test Methods Stormer viscosity (in KU, Krebs Units): Stormer viscosities were measured in accordance with ASTM D 562-81.

ICI viscosity (in Poise): ICI viscosities were measured at high shear rates in accordance with ASTM D 4287-94.

Hot storage stability: the hot storage stability of the paints was determined by measuring the increase in Stormer viscosity (ΔKU) after 14-day storage in a drying cabinet at 50° C.

Freeze/thaw stability: the freeze/thaw stability of the paints was measured in accordance with ASTM D 2243-82 with a freezing cabinet temperature of −18° C. Where there was no coagulation, the Stormer viscosity of the sample was measured after each freeze/thaw cycle.

Test Results for the Paints

The test results for the paints formulated from the binders of Inventive Examples 1-3 and of Comparative Examples 1-3 are found below in Table 1.

TABLE 1

| | Example 1a | Example 1b | Example 1c | Example 1d | Example 2a | Example 2b | Example 2c | Example 3 |
|---|---|---|---|---|---|---|---|---|
| Stormer viscosity (KU) | 107 | 103 | 102 | 102 | 112 | 124 | 103 | 96 |
| ICI viscosity vpoise) | 1.0 | 1.0 | 1.1 | 1.1 | 1.1 | 1.2 | 1.0 | 1.1 |
| Storage stability (ΔKU: KU increase after 2 weeks at 50° C.) | 4 | 3 | 2 | 10 | 2 | 4 | 4 | 8 |
| Freeze-thaw stability (KU after 1, 2, 3, 4, 5 cycles) | 120/125/134/>140/>140 | 113/120/125/128/131 | 114/117/117/119/120 | 120/126/126/127/130 | 121/123/121/126/123 | 133/135/137/138/136 | 114/115/114/115/116 | 122/129/131/131/131 |

| | Comparative Example 1 | Comparative Example 2 | Comparative Example 3 |
|---|---|---|---|
| Stormer viscosity (KU) | 106 | 109 | 97 |
| ICI viscosity (poise) | 1.2 | 1.2 | 1.1 |
| Storage stability (ΔKU: KU-increase after 2 weeks at 50° C.) | n.d. | n.d. | 4 |
| Freeze/thaw stability (KU after 1, 2, 3, 4, 5 cycles) | failed after 1st cycle | failed after 1st cycle | failed after 1st cycle |

The results shown in Table 1 demonstrate that through the use of the inventive, hydroxy-functional comonomers the freeze/thaw stability of the paints investigated can be assured even for a solvent-free formulation at 0 g/l VOC, whereas the comparative examples do not pass the test. Accordingly, the amount of antifrost agent, which is normally used when these paints are produced, can be reduced without loss of stability. In other words the hydroxy-functional comonomers of the invention allow the formulation of low-solvent (low VOC) or solvent-free (zero VOC) emulsion paints which are therefore environmentally friendly.

The invention claimed is:

1. An aqueous coating material comprising
   (a) an acrylate-based binder comprising a latex polymer which comprises 1% to 10% by weight of the polymer of at least one hydroxy-functional comonomer of the general formula (I)

A-[B]$_n$-C where
   A is a polymerizable group,
   B is a spacer,
   C is a hydroxy-functional radical comprising at least two hydroxyl groups, and
   n is 0 or 1,
   (b) at least one pigment,
   (c) water,
   (d) less than 3% by weight of antifrost agent, and
   (e) optionally additional, customary auxiliaries.

2. The aqueous coating material according to claim 1, comprising less than 1% by weight, based on the total weight of the aqueous coating material, of antifrost agent.

3. The aqueous coating material according to claim 1, wherein said hydroxy-functional comonomer (a) is selected from the group consisting of glycerol (meth)allyl ether, glycerol mono(meth)acrylate, sorbitol mono(meth)acrylate, trimethylolpropane monoallyl ether, trimethylolpropane mono(meth)acrylate, pentaerythritol mono(meth)acrylate, 2-methacryloyloxyethylglucopyranoside, allyl-glucopyranoside, and acyloylgalactopyranoside.

4. The aqueous coating material according to claim 1, wherein said hydroxy-functional comonomer (a) is selected from the group consisting of glycerol monomethacrylate and glycerol monoacrylate.

5. The aqueous coating material according to claim 1, comprising less than 0.1% by weight, based on the total weight of the aqueous coating material, of antifrost agent.

6. The aqueous coating material according to claim 1, wherein the acrylate-based binder comprises 2% to 5% by weight of said at least one hydroxy-functional comonomer of the general formula (I).

7. The aqueous coating material according to claim 1, wherein said latex polymer is obtained in a one-stage polymerization.

8. The aqueous coating material according to claim 1, wherein said latex polymer is obtained in a two-stage polymerization.

9. The aqueous coating material according to claim 1, wherein the at least one pigment is present in an amount of about 5% to about 50% by weight by weight of the material.

10. The aqueous coating material according to claim 1, wherein water is present in an amount of about 10% to about 85% by weight by weight of the material.

11. The aqueous coating material according to claim 10, wherein said aqueous coating material has a solids content of about 15% to about 90% by weight by weight of the material.

12. The aqueous coating material according to claim 11, wherein said solids content is about 20% to about 65% by weight by weight of the material.

13. The aqueous coating material according to claim 1, which exhibits an increase in Stormer viscosity of less than 15 KU after 14 days storage at 50° C.

14. The aqueous coating material according to claim 13, wherein the increase in Stormer viscosity is 10 KU or less after 14 days storage at 50° C.

15. A method comprising applying the aqueous coating material according to claim 1 to a substrate.

16. A latex paint comprising
(a) an acrylate-based binder comprising a latex polymer which comprises 1% to 10% by weight of the polymer of at least one hydroxy-functional comonomer of the general formula (I)

$A\text{-}[B]_n\text{-}C$ where
　A is a polymerizable group comprising at least two hydroxyl groups,
　B is a spacer,
　C is a hydroxy-functional radical, and
　n is 0 or 1,
(b) at least one pigment,
(c) water,
(d) less than 3% by weight of antifrost agent, and
(e) optionally, additional customary auxiliaries.

17. A method for improving the freeze-thaw stability of an aqueous coating material comprising adding an acrylate-based binder comprising a latex polymer which comprises 1% to 10% by weight of the polymer of at least one hydroxy-functional comonomer of the general formula (I)

$A\text{-}[B]_n\text{-}C$ where
　A is a polymerizable group,
　B is a spacer,
　C is a hydroxy-functional radical comprising at least two hydroxyl groups, and
　n is 0 or 1, to said aqueous coating material.

* * * * *